United States Patent [19]

Cole

[11] Patent Number: 5,048,199

[45] Date of Patent: Sep. 17, 1991

[54] DEWATERING COMPOSITION

[75] Inventor: Robert Cole, Roanoke, Va.

[73] Assignee: Wen-Don Corporation, Roanoke, Va.

[21] Appl. No.: 605,450

[22] Filed: Oct. 30, 1990

Related U.S. Application Data

[62] Division of Ser. No. 293,914, Jan. 6, 1989.

[51] Int. Cl.$^5$ ................................................ F26B 3/00
[52] U.S. Cl. ......................................................... 34/9
[58] Field of Search ........................... 34/9, 12, 17, 95

[56] References Cited

U.S. PATENT DOCUMENTS

| | | | |
|---|---|---|---|
| 3,943,061 | 12/1976 | Criska et al. . | |
| 3,977,982 | 8/1976 | Hertl . | |
| 4,039,466 | 7/1977 | Matsuda et al. . | |
| 4,066,266 | 9/1988 | Burrill | 252/174.15 |
| 4,097,390 | 4/1978 | Wang et al. . | |
| 4,146,476 | 3/1979 | Edelmann et al. | 210/729 |
| 4,153,549 | 1/1979 | Wang et al. | 252/194 |
| 4,156,649 | 3/1979 | Quinn et al. . | |
| 4,191,155 | 7/1986 | Quinn et al. | 252/60 |
| 4,191,655 | 7/1980 | Quinn et al. . | |
| 4,206,063 | 6/1980 | Wang et al. . | |
| 4,207,186 | 9/1980 | Wang et al. . | |
| 4,211,163 | 5/1988 | Wang et al. | 252/60 |
| 4,231,868 | 10/1980 | Wang et al. . | |
| 4,267,186 | 11/1986 | Wang et al. | 252/60 |
| 4,410,431 | 5/1983 | Roe . | |
| 4,426,409 | 9/1984 | Roe . | |

FOREIGN PATENT DOCUMENTS

| 2679698 | 7/1971 | France . |
|---|---|---|
| 61046691 | 6/1969 | Japan . |
| 78001876 | 3/1978 | Japan . |

*Primary Examiner*—Henry A. Bennet
*Attorney, Agent, or Firm*—Nixon & Vanderhye

[57] ABSTRACT

A dewatering composition for use in dewatering coal and other ores, comprising a sulfosuccinate, a non-ionic surfactant and a defoaming agent.

5 Claims, No Drawings

DEWATERING COMPOSITION

This is a division of application Ser. No. 07/293,914, filed Jan. 6, 1989 now U.S. Pat. No. 4985162.

The present invention relates to a dewatering composition for dewatering wet ores, especially wet coal. More particularly, the present invention provides a dewatering composition for dewatering wet finely divided coal comprising a sulfosuccinate, a non-ionic surfactant and a defoaming agent.

BACKGROUND OF THE INVENTION

It is well known that coal carries surface moisture which occurs naturally or is present as a result of coal processing techniques, such as crushing and washing operations. The surface water may have been sprayed onto the coal to reduce dust, or may be present due to the fact that the coal is in the form of a slurry in water to facilitate transportation in conduits or on belts. Alternatively, the coal may have been exposed to a flotation process in which the coal is carried on the surface of a froth of water and chemicals.

There are two important reasons why residual water should be removed from cleaned coal prior to delivery to a user. The first reason is that surface moisture in excess of about 4 or 5 weight percent can result in serious freezing of coal in railroad cars when shipment is made in sub-freezing weather. The reason for this is that when surface moisture on particulate solids such as coal particles freezes, the ice acts as a powerful adhesive holding the particles together in a mass. The adhesivity is influenced by both the particle size of the solids and the moisture content. For example, coal with as little as 4% moisture will, when frozen, cohere so strongly as to require special handling to break up the frozen mass. It thus becomes difficult to unload or dump railway cars, trucks and other conveyances used to transport coal, mineral ores and other finely divided solids. It also makes it difficult to move coal out of outdoor cold storage piles in a condition for use as a fuel or other use. Unloading frozen coal from railroad cars is time-consuming, and can result in blocked dump shutes. This can result in as much as 30 to 60 tons of coal being left in a railroad car. Various techniques such as vibration, steam lances, fires under the cars, infrared heating in warming sheds and even dynamiting have been tried to unload cars containing frozen coal. The safety problems inherent in some of those techniques are obvious. Other techniques are ineffective or totally impracticable from an economic standpoint, especially where conditions are so severe as to cause entire car loads of coal to freeze solid, as opposed to freezing merely in the perimeter area. All of these factors point to the need for the development of an economic method for treating coal, ores, and other divided solids to overcome the problems of transport of those solids in cold conditions.

The second important reason for removing residual amounts of water is that any moisture which is present on the coal acts to reduce the B.T.U. fuel value of the coal. The fuel value of clean coal is an inverse function of its moisture content, and so any moisture present on the coal acts as a B.T.U. "thief".

In the past, dewatering of wet coal has been accomplished by procedures such as screening, filtration, centrifugation, forced air drying and thermal drying. These processes reduce the quantity of water on the coal, but vary in their effectiveness.

Numerous other approaches have been used with limited degrees of success. Sodium chloride and calcium chloride salts have been added to moist coal as it is being loaded, and this has resulted in some degree of success towards reducing the freezing problem. However, such salts contribute to corrosion of the equipment with which they come into contact. Oil has been used to freeze-proof coal but with questionable effectiveness. Oil soluble surfactants have been added to coal and seem to improve the results. Ethylene glycol has also been employed, but the success has been mitigated by the cost of the treatment which is very high.

Dewatering aids have been utilized in instances where the cost effectiveness of the chemical additives exceeds the incremental equipment charges and related energy costs. A commonly employed dewatering aid comprises a surface active chemical species known generically as sodium dialkylsulfosuccinate. However, that material exhibits a significant foaming tendency and has consequently enjoyed limited use in dewatering compositions.

Some of these problems are described in U.S. Pat. No. 4,426,409 to Roe. Other patents concerned with these problems are U.S. Pat. Nos. 4,039,466 to Matsuda et al, 4,231,868 to Wang et al, 4,153,549 to Wang et al, 4,206,063 to Wang et al, 4,207,186 to Wang et al, 4,191,655 to Quinn et al, 4,410,431 to Roe, 3,977,982 to Hertl and 3,943,061 to Cziska et al.

SUMMARY OF THE INVENTION

It is an object of this invention to provide an improved dewatering composition for use in dewatering wet ores.

It is another object of the invention to provide a dewatering composition which efficiently and economically effects dewatering of wet coal with substantially reduced foaming.

According to one aspect of the present invention, there is provided a dewatering composition suitable for dewatering coal and finely divided ores and having reduced foaming properties, comprising an anionic surfactant, preferably a sulfosuccinate, a non-ionic surfactant and a foam control agent.

According to another aspect of the invention, there is provided a method of dewatering wet ores, preferably wet coal, comprising bringing a dewatering composition of the invention into contact with the coal. Preferably, the composition is applied directly to the coal or is added to process water containing the coal at a rate of about 200 to 2000 ppm, more usually about 700 to 1200 ppm.

The anionic surfactant is preferably selected from sodium dioctylsulfosuccinate, sodium diamylsulfosuccinate, sodium diisobutylsulfosuccinate and disodium isodecyl sulfosuccinate. The sulfosuccinate is usually present in an amount of about 5 to 40% by weight, preferably about 7 to 30% by weight.

The non-ionic surfactant is preferably selected from (a) block copolymers of propylene and ethylene oxide, (b) an ethoxylated nonylphenol, preferably having an HLB value of from 9 to 14, (c) alkyl aryl ethers of the general formula:

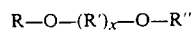

wherein x is an integer of 1 to 12, each of R and R'' is a monovalent hydrocarbon radical, preferably an alkyl, alkoxy, aryl or aryloxy radical. Each of R and R'' may be, for example, alkyl or alkoxy of 1 to 10 carbon atoms, preferably methyl, ethyl, propyl, butyl, pentyl, hexyl, heptyl, octyl, methoxy, ethoxy, propoxy, butoxy, pentoxy, hexyloxy, heptyloxy, octyloxy, or aryl or aryloxy of 6 to 10 carbons, for example phenyl or phenoxy which may be unsubstituted or substituted by alkyl of 1 to 10, preferably 1 to 4, carbon atoms, and R' is a divalent radical derived from an alkoxy or aryloxy radical, for example alkoxy of 1 to 10 carbon atoms, preferably methoxy, ethoxy, propoxy, butoxy, pentoxy, hexyloxy, heptyloxy, octyloxy, nonyloxy, decyloxy, or aryloxy of 6 to 10 carbons, for example phenoxy which may be unsubstituted or substituted by alkyl of 1 to 10 carbons.

A particularly preferred non-ionic surfactant is supplied by GAF, with the trade name Pluronic. Preferably, Pluronic L-61 is employed which has the indicated formula polyoxyethylene/polyoxypropylene (CAS: oxirane, methyl-polymer with oxirane).

An alternative non-ionic surfactant which may be used is manufactured by BASF under the trade name Tetronic. Preferably Tetronic 1101 is employed.

Other non-ionic surfactants which may be employed are manufactured by Rohm and Haas, and have the indicated composition: octylphenoxypolyethoxy ethyl butyl ether, specifically Triton CF-54 and Triton CF-76 or Triton CF-87 having the previously indicated alkyl aryl ether of formula $R-O-(R')_x-O-R''$, where R, R' and R'' are as previously defined, with R preferably being an octyl group or a phenoxy group.

The foam control agent is preferably a silicone defoamer. The defoamer is present in the composition in an amount effective to maintain foaming to a minimum. This can generally be achieved if the defoamer is present in an amount of about 0.5 to 3% by weight, more preferably about 1.5 to 2.5 weight percent. The silicone defoamer is preferably a silicone oil, for example DC-200 or SAG-170 silicone oil. These silicones may be neat oils or they may be oil-in-water emulsions. The typical structure is $R_2-Si-O$ where R is a monovalent hydrocarbon radical, such as the alkyl, alkoxy, aryl and aryloxy radicals described above in connection with the definition of R in the alkyl aryl ethers. Preferably the silicone defoamer has a viscosity ranging from 200 to 1000 centistokes at 25° C., more preferably about 400 to 800 centistokes.

A typical silicone defoamer may be illustrated by the following repeating unit of the polymer:
Polydimethylsiloxane

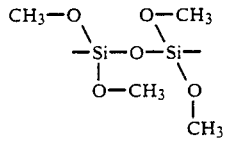

A particularly preferred dewatering composition of the invention comprises 7 to 30 weight percent of a sulfosuccinate (anionic surfactant), 7 to 30 weight percent of a non-ionic surfactant, 0.5 to 3 weight percent of a silicon defoamer, and 40 to 86 weight percent of distilled water.

The dewatering composition of the invention may be applied directly to the coal stream under ambient conditions. Alternatively, the composition may be added to the process water at the rate of about 200 to 2000 ppm, for example 700 to 1200 ppm, preferably about 1000 ppm.

The dewatering composition of the present invention is effective in dewatering wet finely divided ores. In particular, ores having a particle size of up to 1/16 of an inch are particularly suitable for dewatering using the present dewatering composition.

The dewatering composition of the present invention exhibits numerous advantages. In particular, the dewatering composition is highly effective in removing water from coal while at the same time minimizing foaming which is ordinarily associated with the presence of surfactants such as sulfosuccinates. As a result, it is possible to minimise or eliminate the above-mentioned dewatering methods utilizing screening, filtering, centrifuging, or thermal drying. The resulting dewatered coal does not suffer from the earlier-noted disadvantages due to the use of prior approaches where residual water on the coal gives rise to freezing problems as well as a reduced thermal BTU value per unit weight of coal.

EXAMPLES

The following materials were prepared:
Sample of fine coal slurry representative of a coal filter cake, size range; 0 microns to 1/16 inch, containing surface moisture from 22% to 28%.
Coors Porcelain Funnel, plate dia: 83 mm; hgt. 143 mm.
Walter Crucible Holder without glass stem.
500 ml Filter flask with sidearm.
Rubber hose for attachment to water stream and tap water at 60° F.
Dewatering Composition (DWA-32 see below), solution prepared to 1000 ppm concentration in tap water.
Whatman #4 Filter Paper.

A 20 gm sample of the coal slurry is mixed with 50 ml of a water solution containing 1000 ppm concentration of the chemical dewatering composition. This treated coal is poured with the solution into the filter funnel and a partial vacuum is drawn for 2 minutes.

Six 2 gm samples of the filtered coal slurry are taken at random from the filter cake and dried for 2 hours at 140° C. The resulting moisture loss is then determined.

In order to determine the moisture loss from untreated coal slurry, like samples are treated with distilled water only and moisture determinations are made. This procedure serves as a control and gives a baseline upon which to measure effective dewatering.

The following composition of anionic surfactant, non-ionic surfactant and defoamer (identified below as DWA-32) was used. The results of several trials are shown below:

Control - Moisture loss on coal slurry treated with water only, after baking 2 hours, 140° C.

| SAMPLES | MOISTURE LOST | SAMPLES | MOISTURE LOST |
| --- | --- | --- | --- |
| 1 | 23.68% | 1 | 26.51% |
| 2 | 25.57% | 2 | 22.90% |
| 3 | 23.44% | 3 | 22.00% |
| 4 | 24.34% | 4 | 23.41% |
| 5 | 25.25% | 5 | 24.68% |
| 6 | 24.17% | 6 | 28.29% |
|   | 24.40% Avg. |   | 24.63% Avg. |

Coal treated with dewatering composition at 1000 ppm concentration, after baking 2 hours, 140° C.

| SAMPLES | MOISTURE LOST | SAMPLES | MOISTURE LOST |
|---|---|---|---|
| 1 | 16.94% | 1 | 16.40% |
| 2 | 17.73% | 2 | 14.85% |
| 3 | 17.28% | 3 | 14.90% |
| 4 | 16.45% | 4 | 15.00% |
| 5 | 16.67% | 5 | 14.90% |
| 6 | 17.33% | 6 | 15.19% |
|   | 17.06% Avg. |   | 15.20% Avg. |

As can be seen from the results above, coal treated with the dewatering composition of the invention has less moisture retained on its surface. Water loss at filtering is enhanced from 30% to 38.3%. Consistent results from various trials were in the range of 30% reduction of moisture retained on the coal surface.

The chemical dewatering composition (DWA-32) comprises:

| Anionic Surfactant | 7–30% by wgt. |
|---|---|
| Nonionic Surfactant | 7–30% by wgt. |
| Silicone Defoamer | .5–3% by wgt. |
| Distilled Water | 40–86% by wgt. |

The above constituents are mixed in a stainless steel or polyglass container using mild agitation. The ingredients are added one-by-one while blending to obtain a uniform mix. The product is packaged in 55 gal containers of polyethylene for customer use.

In use, the dewatering composition of the invention may be applied to the coal at an application rate of 500 to 1100 ppm, preferably at a rate of about 1000 ppm. The composition may be sprayed, dripped, pumped or metered onto the coal stream or slurry surface prior to filtration. Alternatively, the product may be sprayed directly onto the filter-cake.

In the case where centrifugation is employed, the product is preferably applied directly onto the feed stream or into the centrifuge itself in order to condition the coal for dewatering.

In the case where screening is employed, the product can be applied directly to the coal or fed into the water supply to effect dewatering of the coal.

While not being bound by any theory, it is believed that the dewatering composition of the invention effectively lowers the surface tension of the water on the surface of the coal. The composition renders the coal hydrophobic, with the non-ionic portion of the compound randomly coating the surface of the coal replacing sites occupied by water.

The combined action of the anionic and non-ionic surfactants enhances the action of the filters, centrifuges and/or screens, by reducing the ability of water to adhere to surfaces. Moisture is then released more easily as it is stressed under gravitational forces.

A significant advantage enjoyed by the dewatering composition of the invention is that foaming is reduced by the defoamer present in the dewatering composition. Foaming is normally caused by the use of surfactants. However, in the present case, foaming is markedly reduced by the presence of the defoamer.

It has been found that residual water on the coal surface can be reduced by 20–38%. As a result, the use of thermal dryers for removing moisture from coal can be reduced greatly and, in some cases, eliminated altogether. In this way, significant cost savings are realized.

I claim:

1. A method for dewatering wet ores, comprising the step of bringing the wet ore into contact with a dewatering composition consisting essentially of about 5 to 40 weight percent of a sulfosuccinate, about 5 to 40 weight percent of a non-ionic surfactant, and an effective amount of a silicone foam control agent.

2. A method according to claim 1, wherein said foam control agent is a silicone oil.

3. A method according to claim 2, wherein said silicone oil is present in the composition in an amount of about 0.5 to 3% by weight.

4. A method according to claim 1, wherein said dewatering composition is added to process water containing coal at a rate of about 200 to 2000 ppm.

5. A method according to claim 4, wherein said composition is added to said process water at a rate of about 700 to 1200 ppm.

* * * * *